March 26, 1929.　　　M. ZACK　　　1,707,036
PROCESS OF ARC WELDING
Filed Oct. 28, 1927
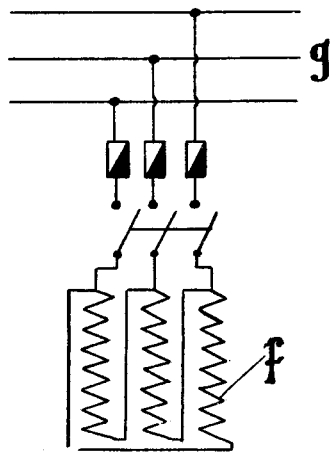
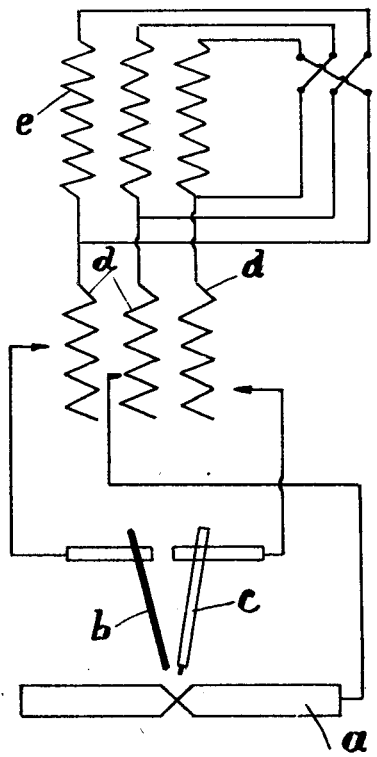
Inventor:
Michael Zack.
by his Attorney:

Patented Mar. 26, 1929.

1,707,036

UNITED STATES PATENT OFFICE.

MICHAEL ZACK, OF COLOGNE-ON-THE-RHINE, GERMANY.

PROCESS OF ARC WELDING.

Application filed October 28, 1927, Serial No. 229,312, and in Germany November 9, 1926.

My present invention has for its object to provide an improved process of and device for arc welding by means of at least two electrodes of different natures used simultaneously.

Benardos' process is well known. According to said process an electrode made of carbon similar to carbons of electric arc lamps is used for obtaining an electric arc, the material lost by vaporization in the welding operation and the material failing in the welding line being completed by the casting of a suitable molten wire (either of the same metal as the piece or not), so that the welding process will be identical with the blow lamp autogenous soldering. Such process has various objects or defects, among which the main objection is that the fed metal wire is cold, whereby a great amount of heat will be absorbed, such heat being supplied by the electric arc of the carbon. On the other hand the arc extending from the carbon, in order to be maintained, will require a comparatively high voltage, say about 45 to 70 volts on one hand, and on the other hand owing to the great amount of heat required for melting the metal wire, a large expense of current which will cause strong vaporization of the carbon, that is prejudicial to the welding.

In order to avoid such defects, the invention contemplates the provision of a plurality of arcs; a heating arc between the carbon and the working piece; a welding arc between the metal wire and the working piece, and a supplemental arc between the carbon and the metal wire.

My new process may be carried into practical effect in different ways either in direct current or in alternate single or multiphase current. In the use of a multiphase current (for instance three or two-phase), one of the conductors will be connected to the working piece, another to the carbon electrode and the third to the metal wire.

In the accompanying drawings I have illustrated diagrammatically an arrangement for carrying my improved process into effect in the most frequent practical case.

Referring to the drawings $a$ is the working piece, $b$ the metal electrode, $c$ the carbon electrode, $d$ the choking or reactance coils inserted behind the conductors of the welding circuit, $e$ the secondary part of a transformer, $f$ the primary part thereof and $g$ the circuit supplying current to the transformer.

In the use of my process, owing to the reciprocal actions of the two electrodes $b$ and $c$, not only the heating voltage, but also the welding voltage, particularly at the carbon electrode, will be lowered and the necessary current strength will be distributed over the three conductors in such a way that the phases of the circuit will be regularly charged.

As the metal wire is not supplied in a cold state, but molten by its own heat produced by the passage of current, all the known defects of Benardos' process will be completely avoided.

My process not only permits of welding by means of three or two-phase current, but it also equally distributes the charge uniformly on the two or three phases respectively. Moreover, owing to the lowering of the lighting voltage, the power factor will be increased.

On the other hand the general use of two different electrodes, of which a particular case is a carbon electrode and a metal electrode, has different advantages which are intimately connected with the fact that by the use of a plurality of electrodes, I will better realize the conditions in which the electric welding takes place, which after all is merely an electro-metallurgical process of a special nature. In fact the use of two different electrodes will result into the intimate melting of two different constituents, so as to obtain a welding of required qualities. Moreover the two electrodes may be selected so that the heat produced will be distributed in the most advantageous way, which it is not possible to obtain if a single electrode only is used. This latter advantage will be considerable if an electrode of carbon and an electrode of metal is used, the first serving primarily to afford the heating arc and the second the welding arc. Particularly my process enables to effect the welding of very thin metal sheets and metals other than iron, the heating of the working piece (sheet or the like) being adjustable independently from the fusion of the metal to be introduced.

It will be obvious that the invention is not all limited to the use of a metal electrode and a carbon electrode, but it may also be applied to the use of two different electrodes made of other materials.

Having now fully described my said invention, what I claim and desire to secure by Letters Patent, is:

The improved process of electric arc welding with direct or alternate currents, which consists in using simultaneously two electrodes at least, arranging said electrodes with relation to each other and to the working piece in such a way as to determine and maintain electric arcs between said electrodes and the working piece on one hand and between the electrodes themselves on the other hand, and making said electrodes of carbon and metal respectively, substantially as set forth.

In testimony whereof I have hereunto set my hand.

MICHAEL ZACK.